United States Patent [19]

Reese

[11] Patent Number: 4,705,138

[45] Date of Patent: Nov. 10, 1987

[54] STEAM TRAP MUFFLER

[75] Inventor: Norman W. Reese, Angleton, Tex.

[73] Assignee: The Dow Chemical Company, Midland, Mich.

[21] Appl. No.: 813,190

[22] Filed: Dec. 24, 1985

[51] Int. Cl.⁴ .............................................. F01N 1/08
[52] U.S. Cl. ................................. 181/212; 181/228; 181/261; 181/265; 181/272
[58] Field of Search ........ 181/212, 237, 243, 258–261, 181/264, 228, 249, 255, 265, 272

[56] References Cited

U.S. PATENT DOCUMENTS

| 428,308 | 5/1890 | Leland | 181/260 |
| 3,115,210 | 12/1963 | Birk | 181/259 X |
| 3,752,260 | 8/1973 | Heath | 181/249 X |
| 4,026,072 | 5/1977 | Dremann | 181/264 X |
| 4,318,720 | 3/1982 | Hoggatt | 181/228 X |

Primary Examiner—Benjamin R. Fuller

[57] ABSTRACT

Disclosed is a simple steam trap muffler. It is comprised of two comentric pipes which are both welded at their first ends to the exhaust pipe of a steam trap. The steam and condensate flows into the inner pipe from the exhaust pipe. The inner pipe has its opposite end capped so that the steam and condensate can not flow to the atmosphere through this inner pipe. However, the inner pipe does have orifices in its circumferential side through which this fluid can flow into the annular space between the first and second concentric pipes. There is no cap on the second end of the outer pipe. Thus the fluid flows along this annular space and out of the muffler through this open end of the outer pipe.

4 Claims, 3 Drawing Figures

STEAM TRAP MUFFLER

BACKGROUND OF THE INVENTION

This invention is an article of manufacture useful in diminishing the eruption of sound which occurs when steam traps intermittently open so as to allow steam and condensate collected in the steam trap to surge into the atmosphere. The invention is also useful in preventing erosion of the ground at which steam trap exhaust pipes are usually directed.

Steam traps are well known to those skilled in the art of transporting steam, particularly those skilled in the art of transporting steam through vessels at higher than atmospheric pressure. As is well known in this art field, the function of the steam trap is to collect the condensate (liquid water condensed from the steam) which is present in the steam flow. As is also well known, the presence of this condensate causes the damaging physical phenomenon known as "water hammer". Hence, the name "steam trap" is a misnomer to the extent that it implies that its purpose is to trap steam. Steam traps are designed to trap and remove condensed water (condensate) from steam lines—not to trap steam.

In practice, steam traps collect this condensate until a predetermined quantity of it has been accumulated within the trap at the pressure of the steam in the pipe line. This predetermined amount then activates a triggering means of the steam trap which opens the steam trap to the atmosphere to let the steam force the condensate out of the trap. Most if not all, of the condensate flashes form liquid from to gaseous form as it surges into the atmosphere, the atmosphere being at lower pressure than the pressure within the steam trap.

Considerable noise is made by this escaping steam and condensate. More importantly, this noise comes in abrupt, unexpected bursts. These bursts are very disquiting to personnel present in the area of the steam trap.

Thus it would be advantageous to have a simple, inexpensive device to muffle these bursts of sounds. However, the muffler can not be one which greatly constricts the surge from the steam trap, for then the trap would not work. This is what prior art mufflers generally do.

It would also be advantageous to have a device which greatly diminishes the erosion of earth which is located beneath most steam traps. This erosion usually comes about in defference to personnel safety considerations. For example, a major safety consideration are burns to such personnel. These safety considerations most often dictate that the burst of steam and condensate intermittently coming from the steam trap be directed downwardly in the direction of the earth beneath the trap in order to avoid burning unwary persons standing or walking nearby. This is usually accomplished by having the steam trap have an exhaust pipe on it which directs the surges of steam and condensate toward the ground. The open end of this exhaust pipe is usually located within about one or two feet of the ground so there will be little hazard of anyone being between the end of the exhaust pipe and the ground.

SUMMARY OF THE INVENTION

The present invention is a simple muffler for a steam trap. The muffler is useful in suppressing the noise produced by the escaping steam and condensate which is vented to the atmosphere from the steam trap. The muffler is also useful in reducing the momentum of the surge of steam and condensate which issues forth from the steam trap when it is tripped open. These features protect personnel and reduce soil erosion. The steam trap muffler is comprised of a first expansion conduit fitted substantially concentrically within a second expansion conduit.

The first expansion conduit has a first and second end. The first end is capable of being sealably and fixedly connected to the exhaust end of a steam trap's exhaust conduit. The second end of the first expansion conduit is capped-off so that no substantial amount of steam or condensate can pass straight through this first expansion conduit to the atmosphere from the exhaust end of the steam trap's exhaust conduit. Rather, the first expansion conduit has orifices in its circumferential sides which allow the steam and condensate to pass from its interior to its exterior through its sides. These orifices are sufficient in number and size so that the sum of the areas of their individual openings is from about three to about nine times the area of the interior cross-sectional area of the first expansion conduit. The interior cross-sectional area of the first expansion conduit itself should be substantially uniform along the length of the conduit, and it should be from about three to about nine times as large as the cross-sectional area of the steam trap's exhaust conduit.

The second expansion conduit also has a first and a second end. Its first end is fixedly and sealably connected to the first end of the first expansion conduit. This second expansion conduit has its second end open to the atmosphere so as to serve as the outlet of the steam and condensate to the surrounding atmosphere from the muffler. The second expansion conduit also has a substantially uniform cross-sectional area along most of its length. This cross-sectional area is from about three to about nine times as large as the cross-sectional area of the interior of the first expansion conduit.

These cross-sectional area ratios provide significant sound muffling and reduction of momentum of the steam without impressing a large back-pressure on the steam trap.

BRIEF DESCRIPTION OF THE DRAWING

The invention will be better understood by reference to the drawing. Therein like reference numbers refer to the same elements in the three figures of the drawing, and therein.

DETAILED DESCRIPTION OF THE PREFERRED EMBODIMENT OF THE INVENTION

Figure 1:
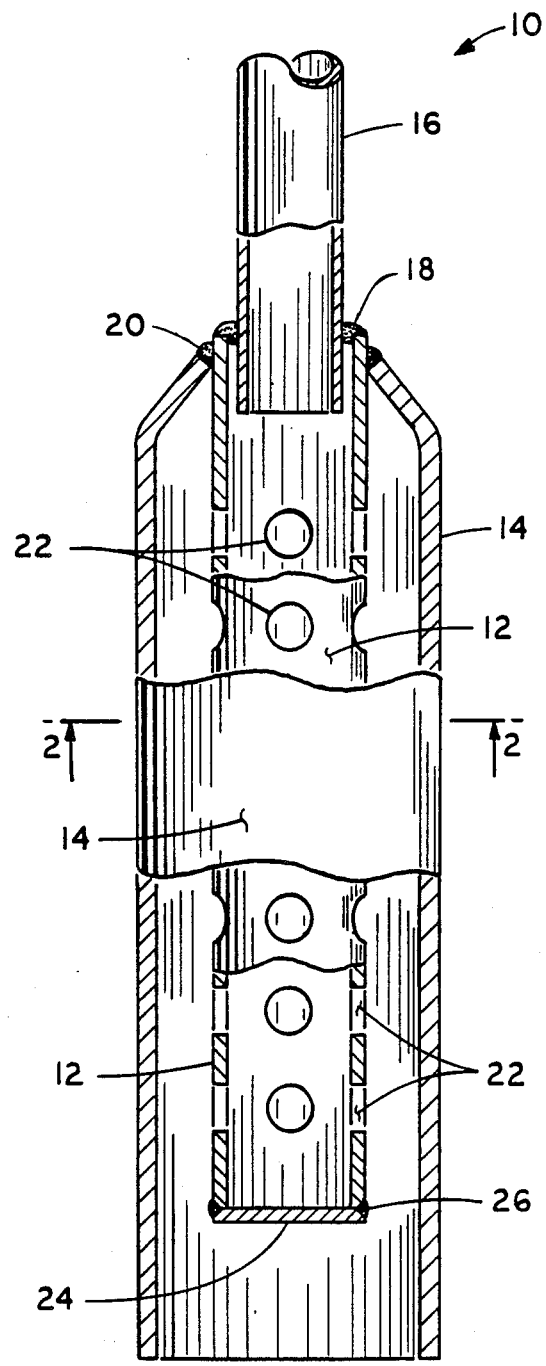
FIG. 1 is a sectional side view of the preferred embodiment of the steam trap muffler.
Figure 2:
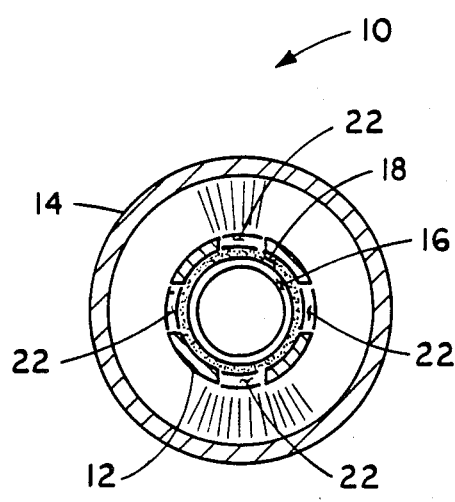
FIG. 2 is a sectional view of the preferred embodiment of the steam trap muffler taken along line 2—2 in FIG. 1.
Figure 3:
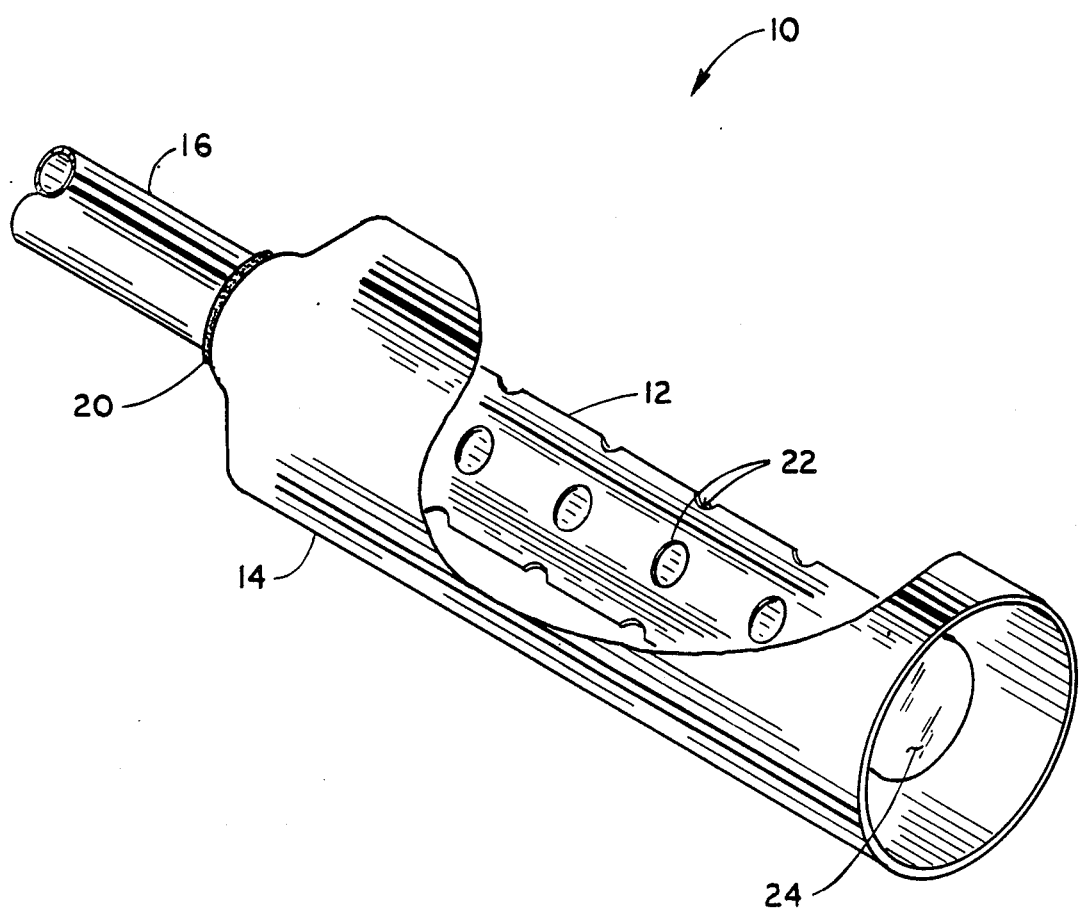
FIG. 3 is a broken-away, perspective view of the preferred embodiment of the steam trap muffler.

In the drawing figures the steam trap muffler is designated as general reference number 10. Steam trap muffler 10 is made generally of conduit pipe 12 and is fixedly positioned in concentric fashion expansion in conduit pipe swage 14.

Pipe 12 is seen to have a first end and a second end. Its first end is seen to be fitted concentrically around the exhaust end of a steam trap's exhaust conduit 16. The steam trap itself is not shown, but, of course, it is connected to the other end of exhaust conduit 16.

Pipe 12 is sealably and fixedly connected to exhaust pipe 16 by annular weld 18.

Pipe swage 14 has a first and second end. It is seen to be sealably and fixedly connected at its tapered, smaller, first end to the first end of expansion pipe 12 by annular weld 20.

Expansion pipe 12 has a multiplicity of circular holes 22 cut in it. In the instant embodiment of muffler 10, there are twenty-eight of these holes 22. These holes are spaced so that there are seven holes 22 in each of four longitudinal rows. These rows are located along the circumferential side of pipe 12. These four longitudinal rows are annularly spaced 90° apart around expansion pipe 12.

Expansion conduit pipe 12 also has a cap 24 welded to its second end by annular weld 26 to prevent steam and condensate from blowing straight through expansion pipe 12 from exhaust pipe 16 to the atmosphere.

On the other hand there is no cap connected to the second end of expansion pipe swage 14. This second end of expansion pipe swage 14 serves as the means of escape to the atmosphere for the steam and condensate from steam trap muffler 10.

There must be a combination of size relationships of the parts of muffler 10 in order to achieve simultaneously the three-prong goal of the invention. Again, this three-prong goal is: (1) significantly reducing the noise level of steam and condensate escaping from a steam trap; (2) significantly reducing the velocity of the steam and condensate escaping from a steam trap; while (3) inducing no significant back pressure on the steam trap. High back pressure on the steam trap will prevent it from opening and closing crisply with a consequential wasteful leakage of steam.

The size relationships of the elements of muffler found necessary to achieve this three-prong goal are: (1) the cross-sectional area of the interior of expansion pipe 12 should be from about three to about nine times as large as the cross-sectional area of the interior of the steam trap exhaust pipe 16; (2) the sum of the cross-sectional areas of each of the individual holes 22 should be from about three to about nine times as large as the interior cross-sectional area of expansion conduit pipe 12; and (3) the interior cross-sectional area of the main body of expansion conduit pipe swage 14 should be from about three to about nine times as large as the interior cross-sectional area of expansion conduit pipe 12.

In operation, steam trap muffler 10 works as follows. Steam and condensate surge from a steam trap (not shown) through exhaust pipe 16 into expansion conduit pipe 12. From pipe 12, the steam and condensate flow are redirected so as to flow outwardly through holes 22 into expansion conduit pipe 14. From pipe 14, the steam and condensate are again redirected to flow through the annulus located between pipes 12 and 14 and then out of the open end of pipe 14 to the atmosphere.

EXAMPLE

The following steam trap mufflers of the same size were used successfully on a 30 psig steam trap, a 235 psig steam trap, and a 475 psig steam trap. The steam trap exhaust pipe 16 was a one-half inch inside diameter schedule 40 steel pipe. The first expansion conduit pipe 12 was a one inch inside diameter schedule 40 steel pipe which was nine inches long. It had twentyeight openings which were each $\frac{3}{8}$ inch in diameter. The second expansion conduit pipe swage 14 was a one-half inch to two inch pipe reducer or swage. The narrower part of the swage 14 was cut off sufficiently for the tapered part of pipe swage 14 to fit around the one-inch diameter pipe 12. In the embodiment used, the two inch diameter part of the swage 14 was lengthened to about 9 $\frac{1}{4}$ inches by welding a two inch diameter schedule 40 steel pipe to it. This weld is not shown in the drawing figure.

Having described the invention and its preferred embodiments, obvious equivalents will occur to those of ordinary skill in the art which do not depart from the spirit of the invention. These obvious equivalents are accordingly included in the invention.

Therefore what is claimed is:

1. A steam trap muffler adapted for connecting to an exhaust end of an exhaust conduit of a steam trap comprising:

A. a first expansion conduit to allow the expansion of steam and the expansion of condensate flashing to steam as the steam and condensate surge from the exhaust end of the exhaust conduit of the steam trap; said first expansion conduit having a first end capable of being fixedly connected to the exhaust end of the exhaust conduit of the steam trap and a second end being at least substantially capped; said first expansion conduit having a substantially uniformly sized interior cross-sectional area along its length with said cross-section area being from about three to about nine times greater than the interior cross-sectional area of the exhaust conduit of the steam trap; said first expansion conduit having orifices through it to allow condensate and steam to flow out of said first expansion conduit; said orifices being suficient in number and size so that the sum of the area of their individual openings is from about three to about nine times the area of the interior of the cross-section of said first expansion conduit; and B. a second expansion conduit having a first end and a second end; which has an interior cross-sectional area which is from about three to about nine times as large as the interior cross-section area of the first expansion conduit; which is substantially annularly disposed around the first expansion conduit; said first end of the second expansion conduit sealably and fixedly connected to the first end of the first expansion conduit; said second end of the second expansion conduit open to the surrounding atmosphere so as to be capable of allowing the surges of steam and condensate which intermittently escape from steam traps to escape to the atmosphere in a much less noiseful fashion so as not to frighten personnel in the immediate vicinity of the steam trap and also to essentially prevent erosion of the ground which occurs because most steam trap exhaust pipes are directed toward the ground to protect personnel.

2. The steam trap mufflers of claim 1 wherein the capped end of the first expansion conduit is totally closed off so that no steam or condensate can escape through said capped end.

3. The steam trap muffler of claim 1 wherein the first end of the first expansion conduit is also capable of being sealably connected to the exhaust end of the steam trap's exhaust conduit.

4. The steam trap muffler of claim 1 wherein said muffler is actually attached to the exhaust conduit of the steam trap.

* * * * *

UNITED STATES PATENT AND TRADEMARK OFFICE
CERTIFICATE OF CORRECTION

PATENT NO. : 4,705,138
DATED : November 10, 1987
INVENTOR(S) : Norman W. Reese

It is certified that error appears in the above-identified patent and that said Letters Patent is hereby corrected as shown below:

Column 1, line 32, "form" should read --from--; "from" should read --form--; lines 37 and 38, "disquiting" should read --disquieting--.

Signed and Sealed this

Twenty-third Day of August, 1988

Attest:

DONALD J. QUIGG

Attesting Officer

Commissioner of Patents and Trademarks